April 29, 1952  G. C. DRAPER  2,594,406
ATTITUDE INDICATING UNIT
Filed June 3, 1950  2 SHEETS—SHEET 2

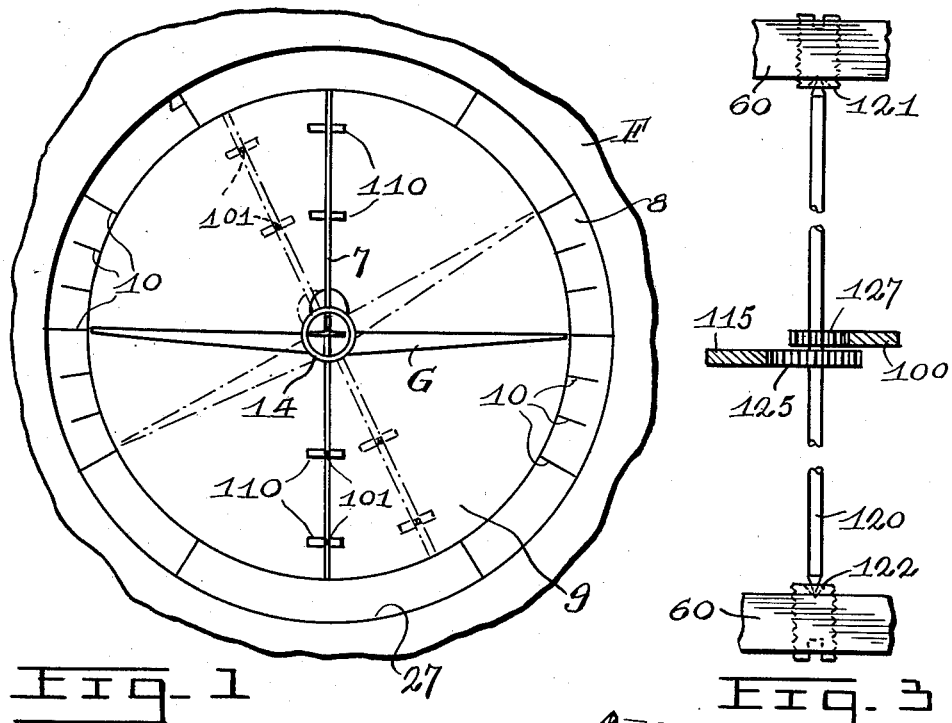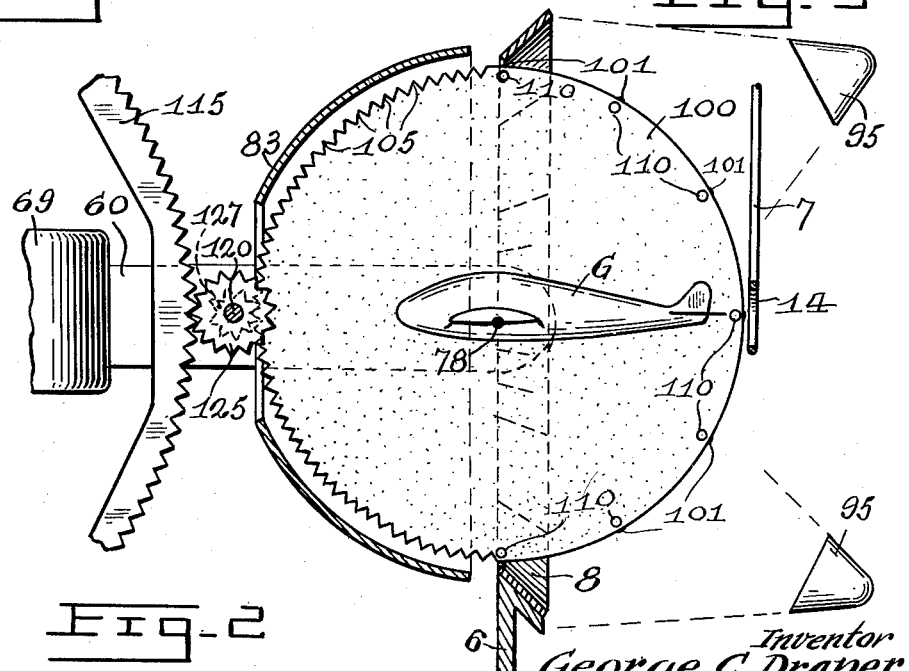

Inventor
George C. Draper
By Alan Swabey
Attorney

Patented Apr. 29, 1952

2,594,406

UNITED STATES PATENT OFFICE 2,594,406

ATTITUDE INDICATING UNIT

George C. Draper, Rosemere, Quebec, Canada

Application June 3, 1950, Serial No. 165,915

1 Claim. (Cl. 33—204)

This invention relates to instruments for indicating the attitude of a craft or vehicle in relation to a reference plane. More specifically, the invention relates to an attitude indicator for aircraft to enable the pilot to determine the attitude of his aircraft with relation to the horizontal plane.

Applications Serial Number 578,533 filed February 17, 1945 and Serial Number 73,140 filed January 27, 1949, now Patents 2,515,199 and 2,515,200, disclose instruments using as the indicator the small replica of a craft and means causing the indicator to appear to assume the same relative position with respect to the craft in which it is placed as the craft has to the horizontal plane. The present invention provides an improved way of constructing and mounting an indicator of this type.

In the specific construction shown in the prior applications, the indicator is a three-dimensional craft journalled in the outer gimbal fork of a gyroscope through spindles extending from the wing tips of the replica. In this construction the position of the wing tips of the indicator indicate the degree of bank. The position of the nose and tail and of indices on supports extending above and below the body of the indicator on a plane perpendicular to its transverse axis and running through its longitudinal axis serve as additional means of observing pitch. The position of the indicator is noted exactly by relating the position of the craft or the indices attached to it to appropriate graduations between the indicator and the observer. The indicator is actuated by mechanism including a sprocket on the spindles driven by a chain from a sprocket on the gyroscope spindle.

The construction of the present invention simplifies the mechanism for driving the indicator and also simplifies reading the instrument. In this construction, the indicator has a circular or arcuate driving track concentric with the axis of pitch. By choice, the structure includes an indicator support which is a disc or discoid bisected by the longitudinal axis and perpendicular to the transverse axis of the replica of the craft. As in the previous forms of device, the bank indications are judged by referring the wing tip indices to a radially graduated dial. The edge of the disc, that is the track, is graduated or marked in indices or else there are special indices projecting from the sides of the disc near its peripheral edge. Pitch readings can be taken by relating the edge of the disc or its graduations to an index fixed to the casing of the indicating mechanism. No matter what the attitude of the indicator the edge of the disc will always be in front of the fixed index which is merely a point of reference, and the particular indexed graduation on the dial which is adjacent to the reference point will indicate the degrees of pitch.

The indicator is driven by driving contact between the edge of the disc and a transmission member driven from the inner gimbal ring. Preferably, the inner gimbal ring is provided with a rack which meshes with a gear on a spindle mounted on the gimbal fork between the inner gimbal ring and the indicator. Another gear or wheel on the spindle in turn drivably engages the track on the indicator disc. Friction wheels can be employed but gearing is preferred owing to its positiveness. The arrangement described has all the advantages of the type of indicator disclosed specifically in the prior applications and is simpler to construct and to use.

For a more complete understanding of the invention a specific preferred embodiment of it will be described by reference to the accompanying drawings in which:

Figure 1 is a front elevation of the instrument as seen by the pilot.

Figure 2 is a fragmentary vertical cross-section through the indicator proper, part of the inner gimbal ring and the transmission for driving the indicator from the gyroscope.

Figure 3 is a fragmentary top plan view intended to show in more detail the transmission of Figure 2.

Figure 4:
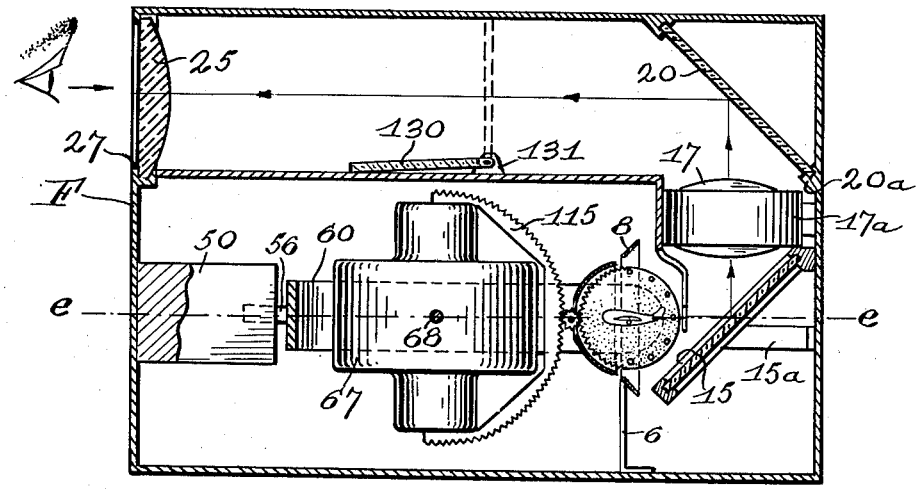
Figure 4 is a transverse vertical cross-section through the instrument.
Figure 5:
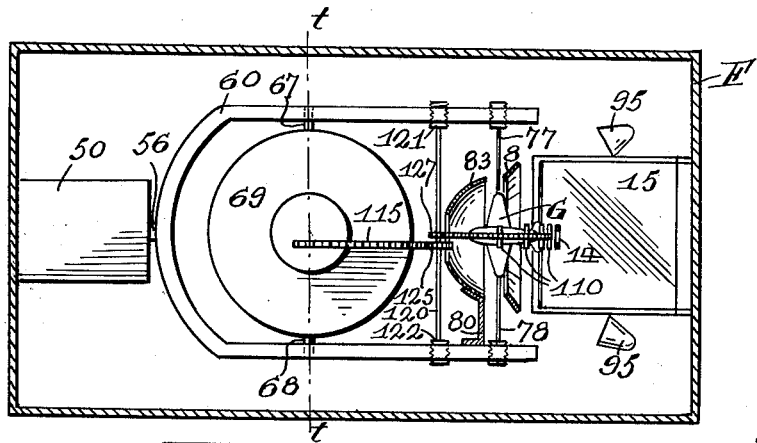
Figure 5 is a horizontal cross-section through the instrument.

Referring more particularly to the drawings, the device includes a casing F which is mounted in the aircraft so that it has longitudinal and lateral axes which register with those of the aircraft. First axis is that about which the aircraft banks, and the second is that about which it dives and climbs. The first axis $e$—$e$ will be referred to as the longitudinal axis and the second axis $t$—$t$ as the transverse axis. The casing F includes a projection or housing 50 in which are mounted bearings which carry the shaft 56 on which is mounted a bifurcated gimbal ring 60. The ring 60 includes bearings (not shown) for the shafts or trunnions 67 and 68 of an inner gimbal ring 69 which carries a gyroscope. The gimbal ring 60 also journals two shafts or spindles 77 and 78 which carry the indicator G.

In the specific form shown, the indicator assembly is made up of a disc 100 preferably of transparent material which is bisected by the longitudinal axis of the indicator proper, which is the replica of an aircraft G. The spindles 77 and 78 extend from the wing tips of the indicator G. The front half of the peripheral surface of the disc 100 is provided with teeth 105. In the drawings these teeth have been shown integral with the disc. When the disc is made of a transparent material or, for that matter, of any suitable material, the teeth can be formed right on the edge as shown. Alternatively, a separate ring can be provided on the edge of the disc made of metal or any other suitable material on which the teeth are formed. The rear half of the peripheral surface of the disc 100 carries indices in the form of pins 110 which carry graduation markings, for example numerals. Markings on the edge of the disc may be substituted for the pins, these markings being shown at 101, or both markings and pins may be used.

Figures 6, 7:
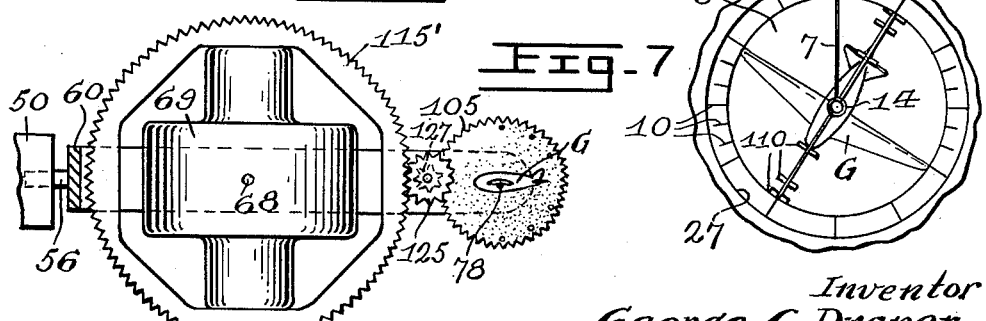
Figure 6 is a fragmentary vertical cross-section adapted to show the relationship of the indicator to the gyroscope and the driving relationship between the parts in a slightly different arrangement from the previous figure.
Figure 7 is a pilot's eye view showing the apparent position of the indicator when the aircraft is doing a banking dive.

The inner gimbal ring 69 is provided with a semicircular rack 115 (Fig. 4) or a circular rack 115' (Fig. 6). Between the inner gimbal ring 69 and the indicator 100 is a spindle 120 which is journalled in bearings 121 and 122 mounted in the outer gimbal fork 60. A gear 125 on the spindle 120 meshes with the rack 115. A gear 127 on the shaft 120 meshes with the teeth on the disc 100.

Through this arrangement movement of the aircraft about the axis of pitch will cause corresponding relative movements between the inner gimbal ring 69 and the outer gimbal ring 60 which will be transmitted to the indicator 100 through the rack 115, the gears 125, 127 and the disc 100. Movements of the aircraft about the longitudinal axis will cause relative movements between the gimbal fork 60 and the casing F and consequently between the indicator G and the casing F.

Lights 95 are provided to illuminate the indicator. A bracket 80 which extends inward from one arm of the ring 60 carries a shield 83, preferably concave, which serves as a background against which the indicator is viewed.

Below the indicator G is a bracket 6 which supports an annular dial 8. The dial 8 is marked with radially arranged graduations 10 about its inner surface, as shown in Figure 1. The dial 8 frames an opening 9 through which the indicator G is seen. Extending vertically in front of the indicator G is a support 7 on the end of which is a circular loop 14. The loop 14 is arranged so that its center registers the zero position in pitch when registering with the tail of the replica. The support 7 and the ring are preferably made of wire of a gauge sufficiently fine that it will not obstruct the view of the indicator. The loop 14 merely serves as a reference to the graduations on the edge of the disc 100.

The optical system of the instrument includes a mirror 15 mounted on a bracket 15a and positioned directly in front of and in register with the opening 9 of the dial 8. The mirror is angled as shown in the drawing to reflect the image of the indicator upward. Mounted above the mirror 15 and supported in a mounting 17A attached to the casing F is a double lens 17. A second mirror 20 is mounted on a bracket 20A attached to the casing F above the double lens 17 and so reflects the image of the indicator G towards the viewing lens 25 which is mounted in an opening 27 in the casing F.

In principle, the operation is similar to that of the prior applications referred to above. The pilot looking at the field or lens 25 sees the indicator reflected by the mirror 15, transmitted through the double lens 17, reflected by the mirror 20 and transmitted through the lens 25. This optical system inverts the image of the indicator twice in the vertical sense and once in the lateral sense. The effect of this is that a picture is presented to the observer or pilot of a model or replica of an aircraft, its tail towards him and right side up and which moves about its longitudinal and transverse axes in the same direction and to the same degree as the aircraft in which it is mounted.

As in the constructions of the prior applications, when the aircraft banks the outer gimbal ring 60, being rotatably mounted on a shaft 56, is maintained on a horizontal plane by the action of the gyroscope. As the indicator G is mounted between the arms of the outer gimbal ring 60 it also is maintained in a horizontal plane. By viewing the indicator through the lens 25 it is thus possible, by the relative position of the indicator wing and the radial graduations on the dial 8 to tell at a glance the degree of bank.

When the aircraft is tilted nose up or nose down, the inner gimbal ring 69, being mounted for pivotal movement within the outer gimbal ring 60, is maintained in a horizontal position through the action of the gyroscope. This movement between the outer and inner gimbal rings 60 and 69 is transmitted through the transmission system to the indicator G so that the indicator is maintained on a horizontal plane while the casing is tilted.

By viewing the indicator through the lens 25 it is thus possible by the relative position of the ring 14 and the pins 110 to tell at a glance the degree of pitch.

In addition to providing an exact reading through the graduations 110 on one hand and the graduations 10 on the other, the pilot also gets an accurate impression of the position of his aircraft by observing the position of the replica aircraft in relationship to the aircraft which he is flying.

This arrangement in addition to its improvement has the overall advantages of the construction shown on the prior applications as compared with prior instruments. The indicator is shown relative to graduated scales in exactly the same angular position that the aircraft assumes relative to the ground. For example, when the aircraft banks, by dipping its right wing, the indicator stays horizontal, so that relative to the mounting it will dip its right wing (looking from rear to nose of the indicator), and it will be seen in the viewing lens to dip its right wing. When the aircraft banks by dipping its left wing, the indicator will likewise be seen in the viewing lens as dipping its left wing. When the aircraft lowers its nose, the indicator stays horizontal; that is, it will lower its nose with respect to the mounting. When the aircraft raises its nose, the indicator replica will do likewise.

It is also contemplated to provide adjustable supports for the mirrors and lenses so that the direction of the exit pupil of the optical system can be varied, in both the lateral and vertical sense. Further, the position of the lens 17 may be varied, for example, the lens may be placed between the viewing lens 25 and mirror 20. It is also contemplated to provide means for placing coloured glass, or the like, between the indicator and the lens 25. This is, for example, illustrated in Figure 4 where the coloured glass 130 is shown pivoted as at 131 so as to be capable of being moved into the position shown in dotted lines by a means (not shown) so that the reflected image will be of an appropriate colour for night flying.

This application is a continuation-in-part of application Serial No. 73,140 filed January 27th, 1949, which is a continuation-in-part of application Serial No. 578,533 filed February 17th, 1945. These prior applications are now Patents Number 2,515,199 and 2,515,200, respectively.

I claim:

An attitude indicator, comprising, a mounting adapted to be mounted in the craft with its longitudinal and transverse axes parallel to those of the craft, a support mounted for unlimited rotation about said longitudinal axis, a three-dimensional indicator simulating a craft mounted on such support for unlimited rotation about an axis of pitch passing through said longitudinal axis and at right angles thereto, the indicator including a transparent disc on which the facsimile of the craft is mounted along the longitudinal axis, an actuating means for causing the indicator to assume a corresponding attitude in relation to the longitudinal and transverse axes to that of the craft in relation to the horizontal plane, and graduations adjacent to the peripheral edge of the disc.

GEORGE C. DRAPER.

REFERENCES CITED

The following references are of record in the file of this patent:

UNITED STATES PATENTS

| Number | Name | Date |
|---|---|---|
| 2,450,874 | Braddon | Oct. 12, 1948 |
| 2,505,884 | Cockerell | May 2, 1950 |
| 2,515,199 | Draper | July 18, 1950 |
| 2,515,200 | Draper | July 18, 1950 |